US012224112B2

(12) United States Patent
Fox

(10) Patent No.: US 12,224,112 B2
(45) Date of Patent: *Feb. 11, 2025

(54) # REINFORCED MCEI TRANSDUCER FOR DOWNHOLE COMMUNICATION

(71) Applicant: Joe Fox, Spanish Fork, UT (US)

(72) Inventor: Joe Fox, Spanish Fork, UT (US)

( * ) Notice: Subject to any disclaimer, the term of this patent is extended or adjusted under 35 U.S.C. 154(b) by 476 days.

This patent is subject to a terminal disclaimer.

(21) Appl. No.: 17/713,948

(22) Filed: Apr. 5, 2022

(65) Prior Publication Data

US 2022/0230804 A1 Jul. 21, 2022

(51) Int. Cl.

| | |
|---|---|
| ***H01F 38/14*** | (2006.01) |
| ***E21B 47/12*** | (2012.01) |
| ***H01F 27/24*** | (2006.01) |
| ***H01F 27/28*** | (2006.01) |
| ***H01F 27/32*** | (2006.01) |

(52) U.S. Cl.

CPC ............ *H01F 38/14* (2013.01); *H01F 27/24* (2013.01); *H01F 27/2823* (2013.01); *H01F 27/327* (2013.01); *E21B 47/12* (2013.01)

(58) Field of Classification Search

CPC .......... E21B 47/12; E21B 17/00; E21B 17/02; E21B 17/028; E21B 17/0283; E21B 17/0285; H01F 38/14; H01F 27/24; H01F 27/2823; H01F 27/327

See application file for complete search history.

(56) References Cited

U.S. PATENT DOCUMENTS 6,717,501 B2 * 4/2004 Hall ........................ E21B 47/13 336/15
7,091,810 B2 * 8/2006 Hall ........................ H01F 38/14 336/216
11,814,955 B2 * 11/2023 Fox ........................ H04L 67/34
2004/0149471 A1 * 8/2004 Hall ........................ F16L 15/003 174/21 R

* cited by examiner

*Primary Examiner* — Franklin D Balseca

(57) ABSTRACT

A reinforced MCEI transducer for drill pipe telemetry comprising an annular ferrite trough. The ferrite trough may be a single piece trough or it may be made up of ferrite trough segments arranged intimately end for end. The single piece trough may comprise one or more annular mechanical reinforcements such as a rod, a tube, or a mesh. Trough segments may comprise mechanical reinforcements that when the segments are arranged end for end, they thereby act like continuous annular reinforcements. The annular reinforcements may be embedded radially within the annular ferrite trough. The mechanical reinforcements may be non-electrically conductive, or they may be electrically conductive. The reinforcements may comprise a metal or a non-metal, or a polymer. An annular electrically conductive wire coil may be disposed within the ferrite trough. The ferrite trough may comprise one or more perforations. The ferrite trough may be housed within an annular polymeric block.

20 Claims, 7 Drawing Sheets

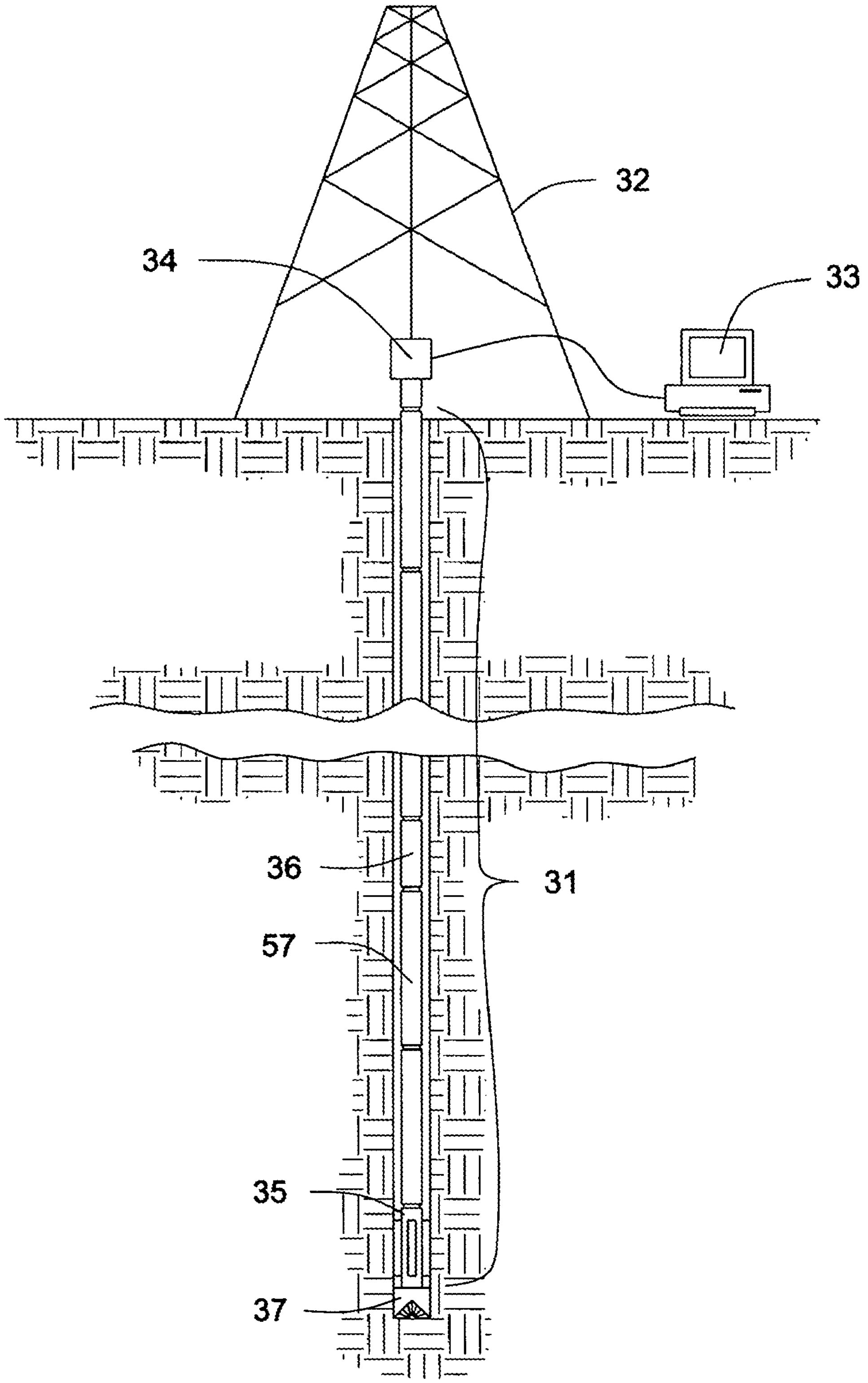
(Prior Art) FIG. 3

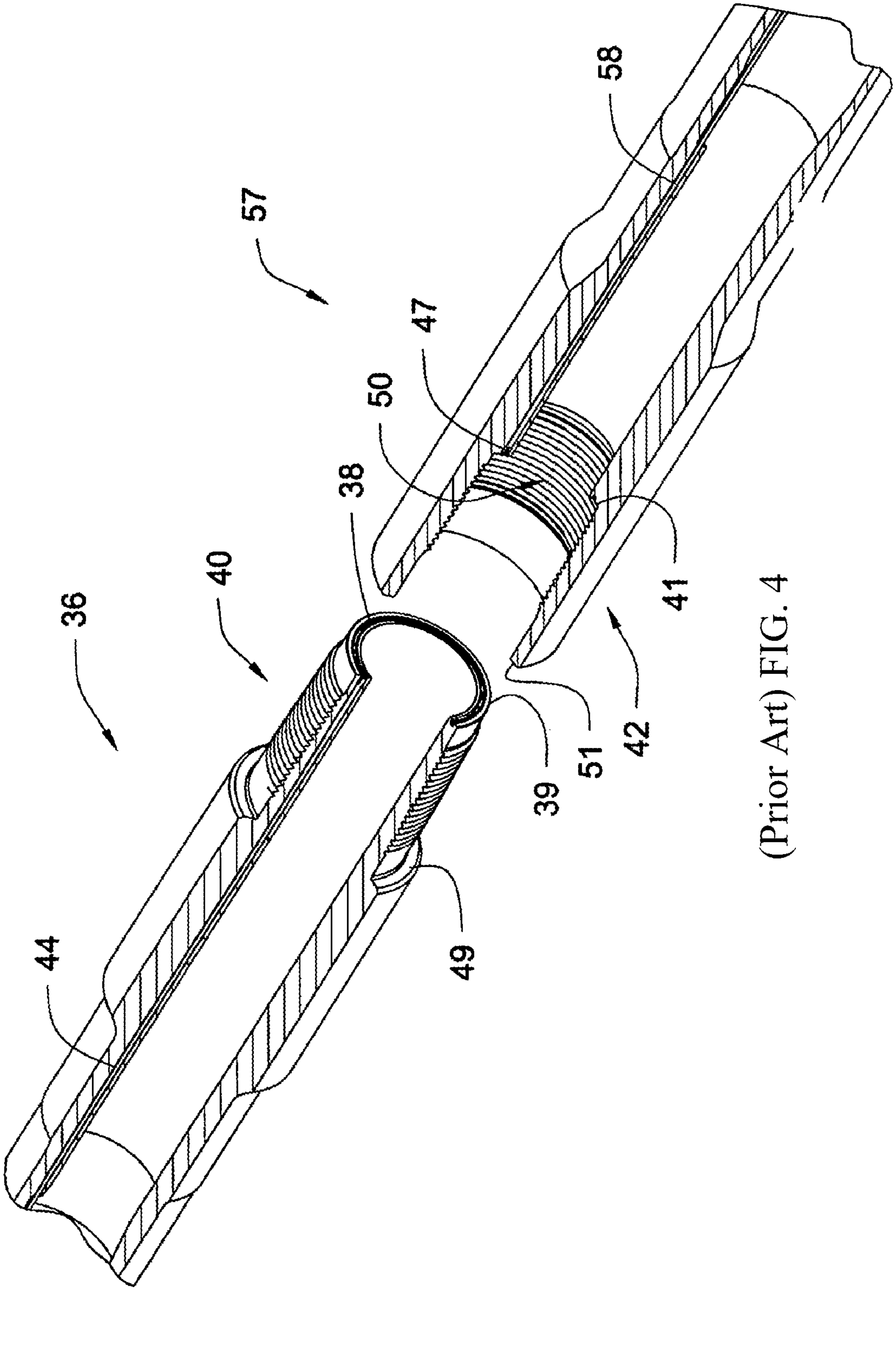
(Prior Art) FIG. 4

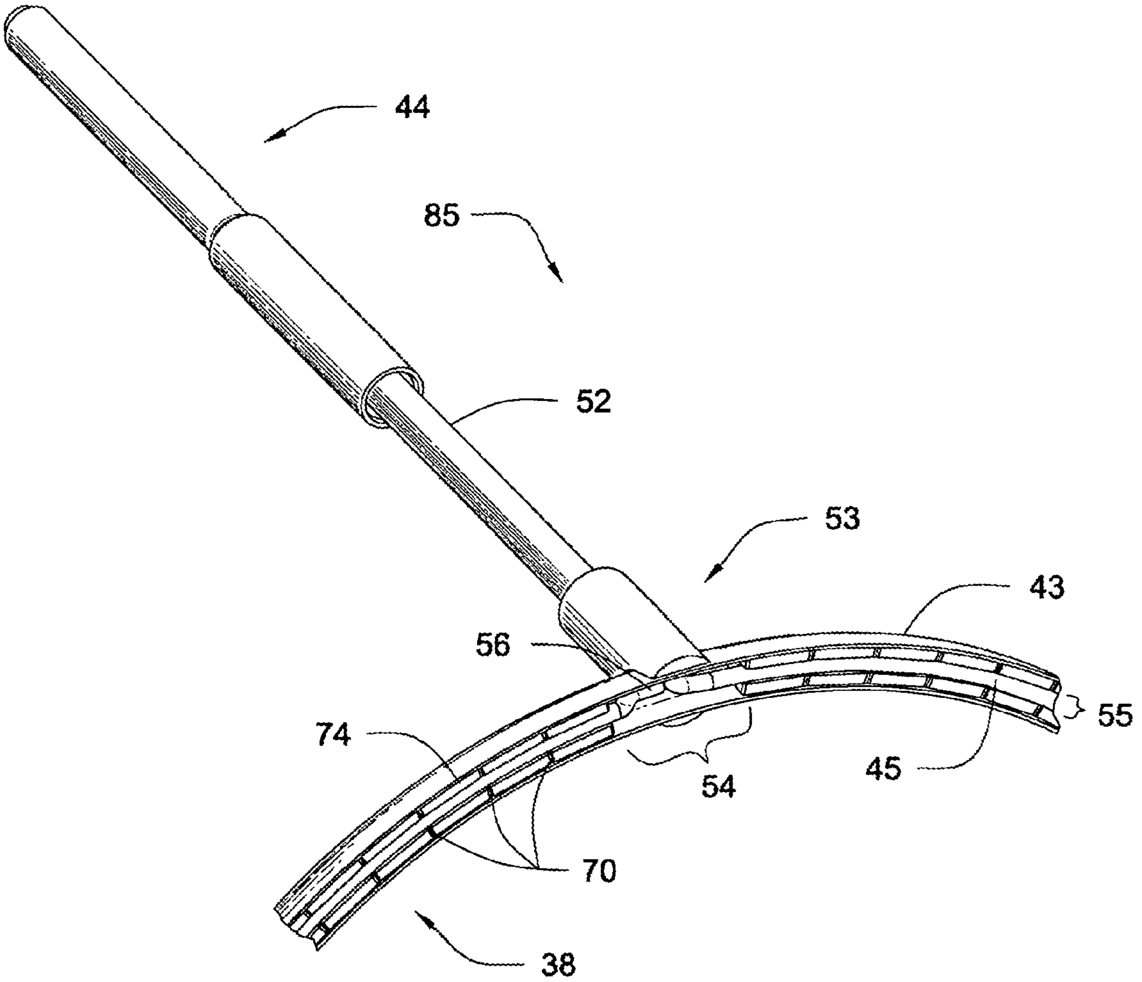
(Prior Art) FIG. 5

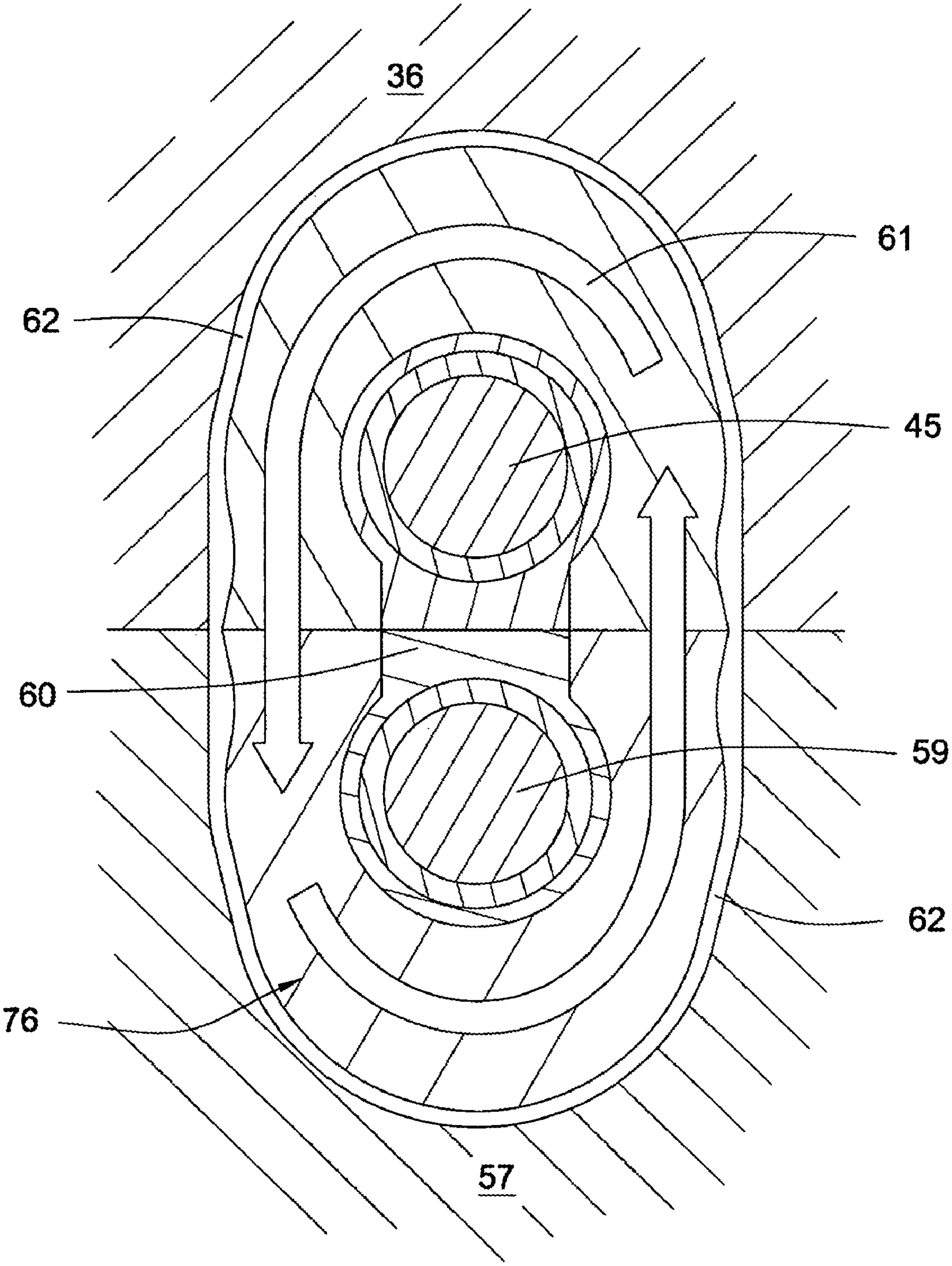
(Prior Art) FIG. 6

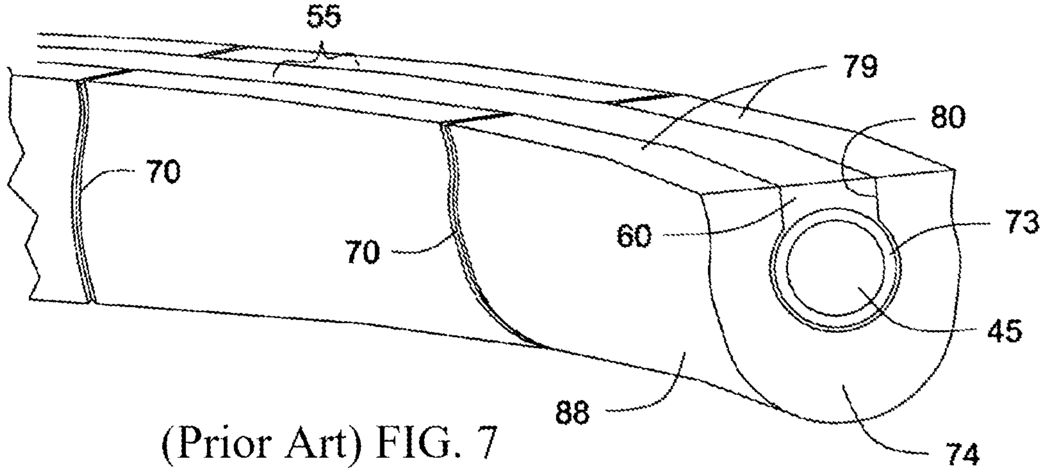
(Prior Art) FIG. 7
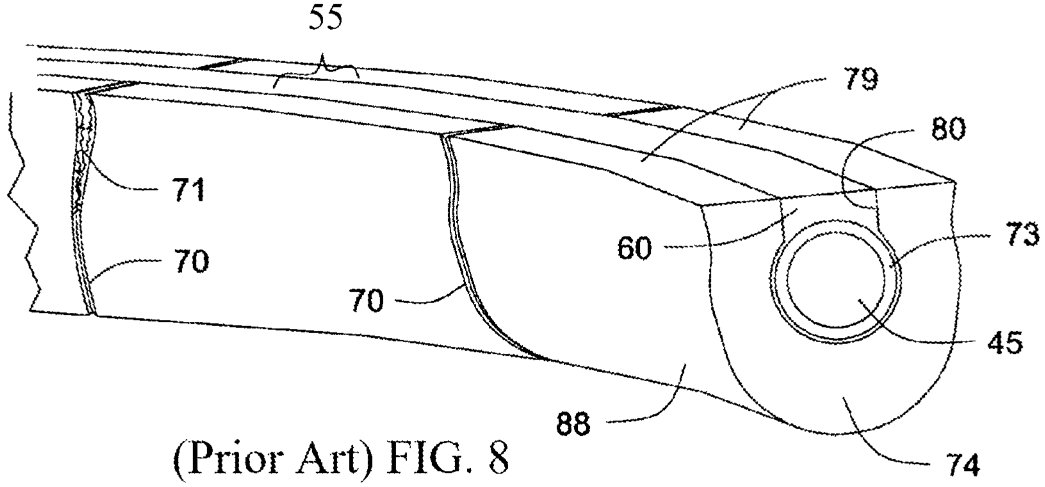
(Prior Art) FIG. 8
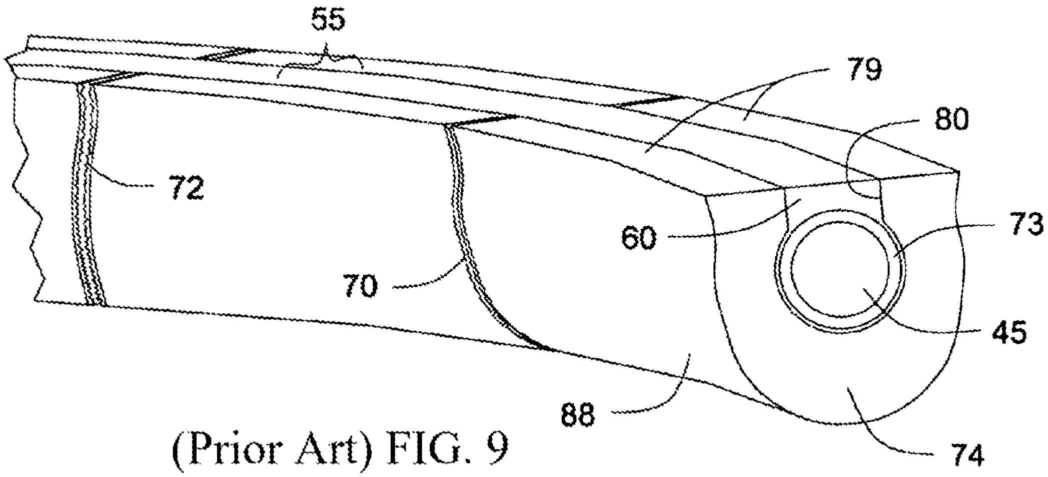
(Prior Art) FIG. 9

REINFORCED MCEI TRANSDUCER FOR DOWNHOLE COMMUNICATION

RELATED APPLICATIONS

This application presents a modification of U.S. Pat. No. 7,091,810, to Hall et al., entitled Element of an Inductive Coupler, issued Aug. 15, 2006, incorporated herein by this reference. Except in reference to FIGS. 1 and 2, this disclosure is largely taken from said '810 reference.

BACKGROUND

This invention relates to elements for use in inductive couplers for downhole components. U.S. Pat. No. 6,670, 880, which is herein incorporated by reference, discloses a downhole transmission system through a string of downhole components. A first transmission element is located in the one end of each downhole component, which includes a first magnetically conducting, electrically-insulating trough, and a first electrically conductive coil lying therein. A second data transmission element is located in the other end, with a similar arrangement comprising a second magnetically conducting, electrically insulating trough and a second electrically conductive coil. The transmission system further comprises an electrical conductor in electrical communication with and running between each first and second coil in the downhole component. The string of downhole components is cooperatively arranged such that the troughs are in magnetic communication with each other and transmit signals through induction.

SUMMARY OF THE INVENTION

This application presents an annular magnetically conductive electrically insulating (MCEI) transducer, sometimes referred to as an inductive coupler, for use in downhole tools such as may be found in the drillstring and tools within the drillstring. The inductive coupler may comprise an annular MCEI trough. The annular trough may present a generally U shaped cross section or it may present a prismatic cross section. The annular trough may comprise an interior wall separated from an exterior wall. The interior and exterior wall may be joined by top and bottom surfaces. The MCEI trough may comprise one or more annular mechanical reinforcements. The mechanical reinforcements may comprise a variety of annular structures. The annular structures may be embedded within the space separating the respective walls of the MCEI trough. The annular structure may be radially embedded within the annular MCEI trough.

The annular structure may comprise one or more annular rods, bars, tubes, slit tubes, or wires, or combinations thereof, arranged within the walls of the MCEI trough. Also, the annular structure may comprise an annular mesh and mesh segments. The annular mesh and mesh segments may comprise a metal or nonmetal. The mesh may be embedded within the walls of the MCEI trough or the mesh may encapsulate the exterior of the MCEI trough. Furthermore, the annular structure may comprise a natural or synthetic fabric. Natural fabrics may include a cotton, silk, wool fabric, or rubber fabric, or a combination of natural fabrics. Synthetic fabrics may include a carbon fabric, a glass fabric, or a polymeric fabric, or a combination of synthetic fabrics. Also, the annular structure may comprise a metal fabric. The presence of the annular structure within the MCEI trough may strengthen the trough and add resilience to the otherwise brittle ferrite trough.

The annular MCEI trough may comprises a continuous ring or a single piece annular trough. An advantage of the single piece trough may be to reduce the leakage of the transmitted signal across the coupled transducers. Or it may be to prevent outside interference with the transmitted signal. Without the annular reinforcements as proposed herein, the single piece trough may be susceptible breakage under the stresses associated with the downhole environment. Nevertheless, the MCEI trough may comprise two or more trough segments. It may be preferred that the fewer trough segments the better for efficient communication downhole. The annular reinforcements proposed in this disclosure may enable a single piece annular trough or a trough comprising the fewest number of trough segments. Whether the annular MCEI trough may be comprised of a single piece or trough segments, the annular trough may comprise at least a portion of the annular reinforcement structures.

The annular reinforcement structures may comprise non-MCEI trough fibers, that is the fibers may be magnetically conductive but not electrically insulating, or vice versa. On the other hand, the MCEI trough may comprises annular reinforcements comprising MCEI fibers.

The annular reinforced MCEI trough may comprise one or more perforations as described in pending U.S. patent application Ser. No. 17/665,533, to Fox, entitled Downhole Transmission System with Perforated MCEI Segments, filed Feb. 5, 2022, incorporated herein by this reference. An electrically conducting wire coil may be disposed within the annular reinforced MCEI trough. Perforations in the MCEI trough may provide an exit passageway for the wire coil to exit the trough.

The reinforced MCEI trough may be molded within an annular polymeric block. Such a configuration is disclosed in pending U.S. patent application Ser. No. 17/559,619, to Fox, entitled Inductive Coupler for Downhole Transmission Line, filed Dec. 22, 2021, incorporated herein by this reference. The annular polymeric block may be disposed within an annular groove within a drillstring tool. furthermore, the annular polymeric block may itself comprise the annular reinforcement structures disclosed herein.

The following portion of the summary is taken from the '810 reference. An element for an inductive coupler in a downhole component comprises a magnetically conductive trough, which is disposed in a recess in an annular housing. The circular or annular trough comprises an outer generally U-shaped surface, an inner generally U-shaped surface, and two generally planar surfaces joining the inner and outer surfaces. The element further comprises pressure relief grooves in at least one of the surfaces of the circular or annular trough. Preferably, the pressure relief grooves are in the outer generally U-shaped surface of the element. The grooves are provided to control the cracking of the magnetically conductive trough. Material, such as ferrite, may crack during the assembly of an inductive coupler. Control crack parallel to a magnetic field is believed to not adversely affect signal transmission between transmission elements.

In the preferred embodiment, an electrically conductive coil is disposed in a trough formed by the inner generally U-shaped surface. As a signal travels around the coil, the magnetically conductive material magnifies the magnetic field created by the electrical signal. The magnified magnetic field may influence a generally circular or annular magnetically conductive trough in an adjacent inductive coupler of an adjacent downhole component. The adjacent generally circular or annular magnetically conductive trough may influence an electrically conducting coil disposed within its trough and an electrical current may be generated.

Disclosed are pressure relief grooves which are scored lines. Preferably the pressure relief grooves are parallel to the magnetic field generated by the magnetically conductive material. In one aspect of the present invention, the element comprises cracks. The cracks may be generally parallel to a magnetic field generated by the magnetically conductive material. It is believed that pressure felt by the element may crack along scored lines. It is also believed that cracks parallel to the magnetic field do not adversely affect the strength of the magnetic field. It is believed that a crack normal to the magnetic field creates a gap with a similar magnetic resistivity as of air, which may weaken the strength of the magnetic field.

The magnetically conductive material may be selected from the group consisting of soft iron, ferrite, a nickel iron alloy, a silicon iron alloy, a cobalt iron alloy, and a mu-metal. In the preferred embodiment the magnetically conductive material is ferrite. Preferably, the magnetically conducting material is also electrically insulating. In one embodiment of the present invention, the generally circular or annular trough of magnetically conductive material is segmented. In another embodiment of the present invention, the generally circular or annular trough of magnetically conductive material is an open-ended ring.

The element may further comprise an electrically insulating filler material. Preferably, the filler material is selected from a group consisting of epoxy, natural rubber, fiberglass, carbon fiber composite, a polymer, polyurethane, silicon, a fluorinated polymer, grease, polytetrafluoroethyene and perfluoroalkoxy, or a combination thereof.

The annular housing may be a metal ring. In one embodiment the annular housing is a steel ring. In another embodiment, the annular housing is a stainless steel ring. Preferably, the annular housing is disposed in a groove formed in the end of the downhole component.

BRIEF DESCRIPTION OF THE FIGURES

(Prior Art) FIG. 3 is a cross sectional view of an embodiment of a downhole tool string.

(Prior Art) FIG. 4 is a perspective cross sectional view of an embodiment of downhole components.

(Prior Art) FIG. 5 is a perspective view of an embodiment of an inductive coupler.

(Prior Art) FIG. 6 is a cross-sectional view of an embodiment of a magnetic transmission circuit.

(Prior Art) FIG. 7 is a partial perspective view of an embodiment of an element.

(Prior Art) FIG. 8 is a partial perspective view of an embodiment of an element.

(Prior Art) FIG. 9 is a partial perspective view of an embodiment of an element.

DETAILED DESCRIPTION OF THE PREFERRED EMBODIMENTS

Figure 1:
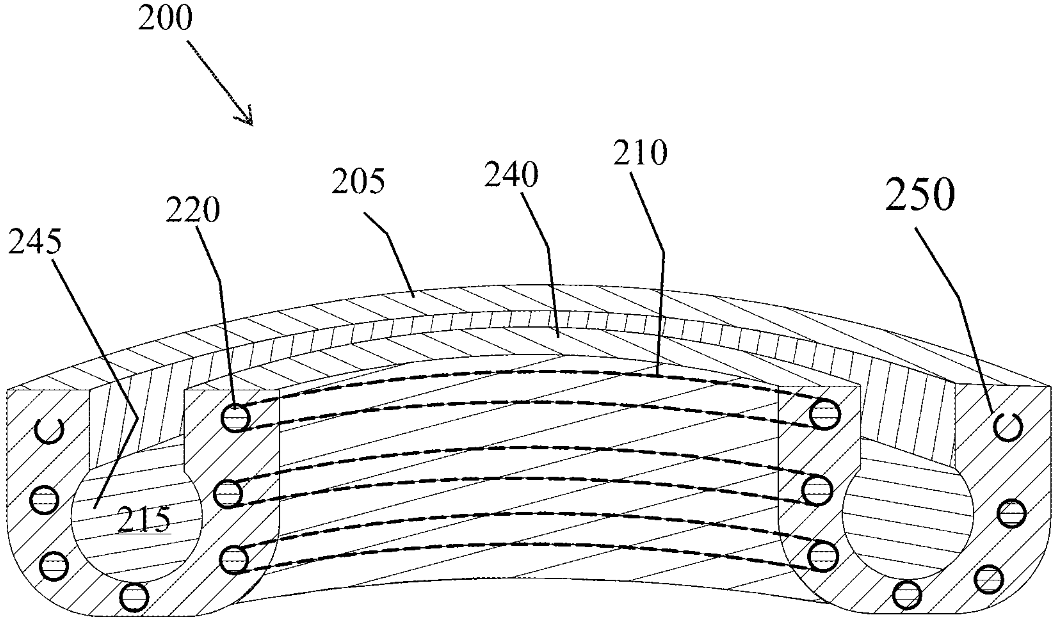
FIG. 1 is a diagram of a sectioned portion of an annular ferrite trough of the present invention.
Figure 2:
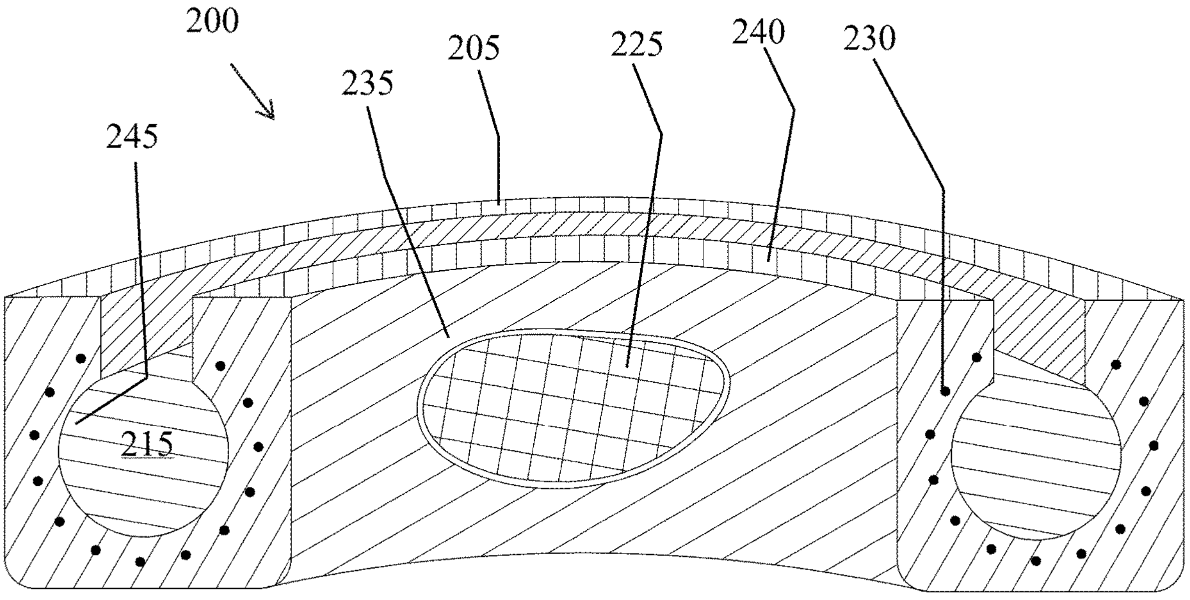
FIG. 2 is a diagram of a sectioned portion of an annular ferrite trough of the present invention.

The following detailed description is in reference to FIGS. 1 and 2. This application presents an annular magnetically conductive electrically insulating (MCEI) transducer, sometimes referred to as an inductive coupler, for use in downhole tools such as may be found in the drillstring and tools within the drillstring. The inductive coupler may comprise an annular MCEI trough, a portion of which is shown at 200. The annular trough 200 may present a generally U shaped cross section or it may present a prismatic cross section. The annular trough 200 may comprise an interior wall 240 separated from an exterior wall 205. The interior and exterior 240/205 walls may be joined by top and bottom surfaces. The MCEI trough may comprise one or more annular mechanical reinforcements. The mechanical reinforcements may comprise a variety of annular structures. The annular structures may be embedded within the radial space separating the respective walls 240/205 of the MCEI trough 200. The annular structure may be radially embedded within the annular MCEI trough 200.

The annular structure may comprise one or more annular rods 210, bars 210, tubes 210, slit tubes 250, or wires 225, or combinations thereof, arranged within radial space or between the walls of the MCEI trough 200. Also, the annular structure may comprise an annular mesh 225 and mesh segments 225, as seen through cut away 235. The annular mesh 225 and mesh segments 225 may comprise a metal or nonmetal. The mesh 225 may be embedded radially within the walls 240/205 of the MCEI trough 200 or the mesh 225 may encapsulate the exterior 205 of the MCEI trough 200. Furthermore, the annular structure may comprise a natural or synthetic fabric. Natural fabrics may include a cotton, silk, wool fabric, or rubber fabric, or a combination of natural fabrics. Synthetic fabrics may include a carbon fabric, a glass fabric, or a polymeric fabric, or a combination of synthetic fabrics. Also, the annular structure may comprise a metal fabric. The presence of the annular structures 230, 220, and 250, as may be seen exposed on the ends of the trough 200, within the MCEI trough 200 may strengthen the trough and add resilience to the otherwise brittle ferrite trough.

The annular MCEI trough 200 may comprises a continuous ring or a single piece annular trough. An advantage of the single piece trough may be to reduce the leakage of the transmitted signal across the coupled transducers. Or it may be to prevent outside interference with the transmitted signal. Without the annular reinforcements as proposed herein, the single piece trough may be susceptible breakage under the stresses associated drillstring tools and with the downhole environment. Nevertheless, the MCEI trough 200 may comprise two or more trough segments. As shown in (Prior Art) FIGS. 7-9. It may be preferred that the fewer trough segments the better for efficient communication downhole. The annular reinforcements proposed in this disclosure may enable a single piece annular trough or a trough comprising the fewest number of trough segments. Whether the annular MCEI trough 200 may be comprised of a single piece or trough segments, the annular trough may comprise at least a portion of the annular reinforcement structures.

The annular reinforcement structures may comprise non-MCEI trough fibers, that is the fibers may be magnetically conductive but not electrically insulating, or vice versa. On the other hand, the MCEI trough may comprises annular reinforcements comprising MCEI fibers. For example, reinforcing fabrics may comprise MCEI fibers.

The annular reinforced MCEI trough 200 may comprise one or more perforations as described in pending U.S. patent application Ser. No. 17/665,533, to Fox, entitled Downhole Transmission System with Perforated MCEI Segments, filed Feb. 5, 2022, incorporated herein by this reference. An electrically conducting wire coil may be disposed within the annular channel 215 of the reinforced MCEI trough. Perforations in the MCEI trough's channel wall 245 may provide an exit passageway for the wire coil to exit the trough.

The reinforced MCEI trough may be molded within an annular polymeric block. Such a block configuration is disclosed in pending U.S. patent application Ser. No. 17/559,619, to Fox, entitled Inductive Coupler for Downhole Transmission Line, filed Dec. 22, 2021, incorporated herein by this reference. The annular polymeric block may be disposed within an annular groove within a drillstring tool. Furthermore, the annular polymeric block may itself comprise the annular reinforcement structures disclosed herein.

The following portion of the detailed description is taken from the '810 reference. Except as modified by FIGS. 1 and 2 and related text, the following description applies to the present invention.

(Prior Art) FIG. 3 shows an embodiment of a downhole tool string 31 suspended in a well bore by a derrick 32. Surface equipment 33, such as a computer, connects to a data swivel 34. The data swivel 34 is adapted to transmit data to and from an integrated transmission network while the downhole tool string 31 is rotating. The integrated transmission network comprises the transmission systems of the individual components 35, 36, 57 of the downhole tool string 31. Preferably the downhole component is a pipe 36, 57. Alternatively the downhole component is a tool 35. Tools 35 may be located in the bottom hole assembly 37 or along the length of the downhole tool string 31. The tools 35 on a bottom hole assembly 37 may be sensors, drill bits, motors, hammers, and steering elements. The tools 35 located along the downhole tool string 31 may be links, jars, seismic sources, seismic receivers, sensors, and other tools that aid in the operations of the downhole tool string 31. Different sensors are useful downhole such as pressure sensors, temperature sensors, inclinometers, thermocouplers, accelerometers, and imaging devices. Preferably the downhole tool string 31 is a drill string. In other embodiments the downhole tool string 31 is part of a production well.

The downhole tool string 31 is made up of components, as shown in (Prior Art) FIG. 4. The components may be pipes 36, 57 or some of the above mentioned tools 35. The components comprise inductive couplers 85 (shown in (Prior Art) FIG. 5) located in the secondary shoulder 39 of the pin end 40 and the secondary shoulder 41 of the box end 42 of the component 36. The inductive couplers 85 may comprise an element 38, 47 comprising an annular housing 43. In one embodiment the elements 38, 47 may comprises a plurality of generally linear, magnetically conductive segments, each of which segments includes an outer generally U-shaped surface 88, an inner generally U-shaped surface 80, and planar surfaces 79 (shown in (Prior Art) FIG. 7). The surfaces 79, 80, 88 together define a generally linear trough 89 from one end to the other end of each segment. The segments are arranged within the housing recess 86 so as to form a generally circular or annular trough 55.

Preferably the element 38, 47 is disposed in an annular groove 62 formed in the secondary shoulders 39, 41. Preferably the annular housing 43 is a metal ring. The annular housing 43 may be a steel ring. In other embodiment the annular housing 43 is a stainless steel ring. The elements 38, 47, in a single downhole component, are connected by an electrical conductor 44. Preferably the electrical conductor 44 is a coaxial cable. In other embodiments the electrical conductor 44 is a pair of twisted wires. In some embodiments, the electrical conductor 44 is a tri-axial cable.

The circular or annular trough 55 may house an electrically conductive coil 45 encapsulated by the magnetically conductive material. Preferably, the magnetically conductive material is an easily magnetized and easily de-magnetized material selected from the group consisting of soft iron, ferrite, a nickel iron alloy, a silicon iron alloy, a cobalt iron alloy and a mu-metal. More preferably the magnetically conductive material is made of ferrite. The coil 45 comprises one loop of insulated wire. Alternatively, the coil 45 may comprise at least two loops of insulated wire. The wire may be made of copper and is insulated with an insulating layer 73 of a varnish, an enamel, or a polymer. When the components 36, 57 of the downhole tool string 31 up are made, the magnetically conductive trough 38, 47 line up adjacent each other and allow data transmission between the components 36, 57. A threaded portion 48 located between the primary shoulder 49 and secondary shoulder 39 of the pin end 40 and a threaded portion 50 located between the primary shoulder 51 and secondary shoulder 41 of the box end 42 provide a means of attachment for the downhole components 36, 57.

(Prior Art) FIG. 5 shows a partial perspective of an element comprising an open-ended ring 74 of magnetically conductive material. Pressure relief grooves 70 are scored into the magnetically conductive material. Also illustrated is a connection between the electrical conductor 44 and the electrical conducting coil 45. In the preferred embodiment, a signal travels along the electrical conductor 44 of the downhole component 36. The signal passes from the electrical conductor 44 to a lead wire 52 of the coil 45. The inductive coupler 85 comprises an anti-rotation device 53, which keeps the annular housing 43 from rotating about the axis of the lead wire 52. In the preferred embodiment the lead wire 52 may enter the annular housing 43 through a hole 75 in the annular housing 43, where there is a void 54 of magnetically conductive material. The coil 45 is housed within the magnetically conductive circular or annular trough 55 and is grounded to the annular housing 43 in the void 54 in the magnetically conductive trough. Preferably, the grounded portion 56 of the coil 45 is brazed to the annular housing 43. In some embodiments of the present invention, the element 38, 47 disposed in a groove 62 formed by the secondary shoulders 39, 41 of both the pin end 40 and also in the box end 42 of the downhole component 36. The open-ended ring 74 may be complete when it is installed into the annular housing 43; however, due to strain felt by the element 38, 47 while it is being installed, the magnetically conductive material may crack during installation.

The elements 38, 47 comprise an electrically insulating filler material 60 which holds the circular or annular trough 55 in place. Preferably the filler material 60 is selected from the group consisting of epoxy, natural rubber, fiberglass, carbon fiber composite, a polymer, polyurethane, silicon, a fluorinated polymer, grease, polytetrafluoroethylene and perfluoroalkoxy, or a combination thereof. Polytetrafluoroethylene and perfluoroalkoxy are the more preferred filler materials 60.

It is important that the electrically-insulating filler material 60 will withstand the elevated pressures and temperatures in downhole conditions. Consequently, it is preferred to treat the filler material 60 to make sure that it does not contain any air pockets. Preferably the filler material 60 is centrifuged to remove all bubbles that might be introduced during mixing. One such treatment method involves subjecting the filler material 60 in a centrifuge. A most preferred form of this method subjects the filler material 60 to a centrifuge at between 2500 to 5000 rpm for about 0.5 to 3 minutes.

(Prior Art) FIG. 6 shows an embodiment of a magnetic transmission circuit 61 formed by cooperating magnetic fields from the element 38 and the adjacent element 47. As the signal travels along the coil 45, the magnetic field from the electrical current is magnified by the magnetically conductive material. The magnified magnetic field influences the magnetically conductive material in the adjacent element 47 in the adjacent downhole component 57. The electrically conducting coils 45, 59 may be arranged in a manner to allow the magnetic fields to generate the magnetic transmission circuit 61. The magnetic transmission circuit 61 may be allowed by disposing one coil 45 in a clockwise direction in the circular or annular trough 55 of magnetically conducting material and disposing an adjacent coil 59 in a counterclockwise direction in an adjacent circular or annular trough 76 of magnetically conductive material. The coil 59 in the adjacent element 47 is influenced by the magnetic transmission circuit 61 to generate an electrical current and that signal is passed to the electrical conductor 58 in the adjacent downhole component 57.

A partial perspective view of an embodiment of the element is shown in (Prior Art) FIG. 7. The coil 45 is encapsulated by an open-ended ring 74 of magnetically conductive material within the generally circular or annular trough 55 formed by the inner generally U-shaped surface 80. A pressure relief groove 70 is formed in the outer generally U-shaped surface 88. In some embodiments the pressure relief groove 70 may be formed in the inner generally U-shaped surface 80 or in at least one of the planar surfaces 79. In the preferred embodiment the pressure relief groove 70 is a scored line.

It is believed that a crack normal to the magnetic field may adversely affect the magnetic transmission circuit 61. It is believed that the crack may have a similar magnetic resistance as air. It is further believed that an area in the magnetic transmission circuit 61 which has a similar magnetic resistance as air may weaken the strength of the entire magnetic transmission circuit 61. A pressure relief groove 70 is believed to control the cracking along the groove 70. It is preferred that pressure relief grooves 70 are parallel to the direction of the magnetic fields. It is believed that cracks controlled by the pressure relief grooves that are formed parallel to the direction of the magnetic fields may not adversely affect the magnetic transmission circuit 61. (Prior Art) FIG. 8 shows an embodiment of an element 38 with a partial crack 71 controlled by the pressure relief groove 70. (Prior Art) FIG. 9 shows an embodiment of an element 38 with a crack 72 that separates the magnetically conductive material.

A preferred method of forming an element 38, 47 of magnetically conductive material begins with providing a mold having a trough conforming to the final dimensions of the circular or annular trough 55. A two-part, heat-curable epoxy formulation is mixed in a centrifuge cup, to which the magnetically conductive material and a length of fiberglass rope are added. The parts are centrifuged for up to 30 minutes to cause all bubbles induced by mixing to rise out of the viscous liquid, and to cause the liquid to penetrate and seal any porosity in the magnetically conductive material. The fiberglass rope is then laid in the bottom of the mold, which is either made from a material, which does not bind to epoxy, such as polymerized tetrafluroethane or which is coated with a mold release agent. The magnetically conductive material is then placed on top of the fiberglass rope, to fill the mold. Any excess epoxy is wiped out of the groove. The planar surfaces 79 of the magnetically conductive material may be precisely aligned by holding it in position with magnets placed around the circular or annular trough in the mold. After the epoxy is cured, either at room temperature or in an oven, the circular or annular tough 46 is removed from the mold. Preferably, lines are scored into the outer generally U-shaped surface, before the element 38, 47 is place in the annular housing 43 or into the annular groove 62 formed in the end of the downhole component 36, 57.

The description above and the attached figures are meant to illustrate specific embodiments of the present invention and not limit its scope. Those having ordinary skill in the art will appreciate that other embodiments will fall within the scope and spirit of the invention as defined in the appended claims.

The invention claimed is:

1. An inductive coupler, comprising:

an annular magnetically conductive electrically insulating (MCEI) trough;

the MCEI trough comprising an annular mechanical reinforcement;

the annular mechanical reinforcement comprising an annular structure, wherein the annular structure is embedded within the annular MCEI trough.

2. The inductive coupler of claim 1, wherein the annular structure is radially embedded within the annular MCEI trough.

3. The inductive coupler of claim 1, wherein the annular structure comprises an annular rod.

4. The inductive coupler of claim 1, wherein the annular structure comprises an annular bar.

5. The inductive coupler of claim 1, wherein the annular structure comprises an annular tube.

6. The inductive coupler of claim 1, wherein the annular structure comprises an annular slit tube.

7. The inductive coupler of claim 1, wherein the annular structure comprises an annular wire.

8. The inductive coupler of claim 1, wherein the annular structure comprises an annular mesh.

9. The inductive coupler of claim 1, wherein the annular structure comprises an annular glass fabric.

10. The inductive coupler of claim 1, wherein the annular structure comprises an annular polymeric fabric.

11. The inductive coupler of claim 1, wherein the annular MCEI trough comprises a single piece annular trough.

12. The inductive coupler of claim 1, wherein the annular MCEI trough comprises two or more trough segments.

13. The inductive coupler of claim 1, wherein the annular MCEI trough comprises two or more trough segments each trough segment comprising at least a portion of the annular structure embedded therein.

14. The inductive coupler of claim 1, wherein the annular MCEI trough comprises non-MCEI trough fibers.

15. The inductive coupler of claim 1, wherein the annular MCEI trough comprises MCEI trough fibers.

16. The inductive coupler of claim 1, wherein the annular MCEI trough comprises one or more perforations.

17. The inductive coupler of claim 1, wherein an electrically conducting wire coil is disposed within the annular MCEI trough.

18. The inductive coupler of claim 1, wherein the MCEI trough is molded within an annular polymeric block.

19. The inductive coupler of claim 1, wherein the MCEI trough is molded within an annular polymeric block and disposed within an annular groove within a drill string tool.

20. The inductive coupler of claim 1, wherein the MCEI trough is molded within an annular polymeric block comprising the annular structure.

* * * * *